United States Patent Office 3,322,542
Patented May 30, 1967

---

3,322,542
STABILIZATION ADDITIVES FOR PHOTO-
CHROMIC COMPOUNDS
Edwin Fisher Ullman and William Arthur Henderson,
Jr., Stamford, Conn., assignors to American Cyanamid
Company, Stamford, Conn., a corporation of Maine
No Drawing. Filed Nov. 14, 1963, Ser. No. 323,592
18 Claims. (Cl. 96—90)

This invention relates to a novel method for the stabilization of photochromic compounds against molecular deterioration. More particularly, this invention relates to a novel method for the stabilization of photochromic compounds against molecular degradation which comprises contacting the photochromic compound with at least one of a group of stabilization additives. Still more particularly, this invention relates to a novel method for increasing the lifetime of photochromic behavior of various photochromic compounds by as much as tenfold by incorporating therein (A) an amine having the formula

wherein R is hydrogen or an alkyl ($C_1$–$C_6$) radical and $R^1$ and $R^2$, individually, are aryl ($C_6$–$C_{10}$) or alkyl ($C_1$–$C_6$) radicals, and when R is hydrogen, $R^1$ and $R^2$ are alkyl, aryl or together with the nitrogen from a 5 to 6 membered alkylenimine ring and when R is an alkyl radical, $R^1$ and $R^2$ are alkyl radicals or $R^1$ is an aryl radical and $R^2$ is an alkyl radical.

(B) a phosphine having the formula

wherein $R^3$ and $R^4$ are, individually, an alkyl ($C_1$–$C_6$) radical or an aryl ($C_6$–$C_{10}$) radical, and Z is an aryl ($C_6$–$C_{11}$) radical, (C) an arsine having the formula

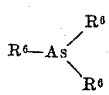

wherein $R^6$ is an ryl ($C_6$–$C_{10}$) radical
(D) a nitroxide,
(E) a nitro compound having the formula

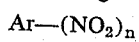

wherein Ar is a monocyclic aryl or an alkoxy substituted monocyclic aryl radical and n is a whole positive integer of from 2 to 3, inclusive, or
(F) mixtures of (A), (B), (C), (D) or (E).

Still more particularly, this invention relates to various thermoplastic polymer compositions containing a mixture of a photochromic compound and a stabilizer and to the mixtures of the photochromic compounds and stabilizers per se.

Photochromic compounds are well known in the art as is their usage in such applications as temporary data storage devices, reflectants for incident high-intensity radiation and the like. One of the problems, however, in regard to known photochromic systems, is the failure of many compounds to retain their ability to change color over a lengthy period of time. That is to say, due to an infinitesimal amount of degradation of deterioration of the photochromic system each time a color change occurs, the lifetime of each system is of a specific length. When the lifetime of the system is terminated, the usefulness of the system, of course, is also terminated and replacement of the system, or the media containing the system is necessary. Such a replacement can, in many instances, consist of a very tedious process which, in addition, may be very costly.

We have now discovered that the active lifetimes of various photochromic compounds can be substantially lengthened by the incorporation of various additives therewith. That is to say, by mixing, incorporating, or dispersing etc. a stabilizing amount of a specific additive with known photochromic systems, the lifetimes, i.e., cycles of color change, of the systems are extended or increased by as much as ten to fifteen fold.

It is therefore an object of the present invention to provide a novel method for the stabilization of photochromic compounds against molecular deterioration.

It is a further object of the present invention to provide a novel method for the stabilization of photochromic systems against molecular degradation which method comprises contacting the photochromic system with a stabilizing amount of at least one of a group of stabilizing compounds set forth as (A), (B), (C), (D), (E) and (F), above.

It is still a further object of the present invention to provide a novel group of photochromic compositions comprising a thermoplastic polymer having dispersed throughout the body thereof a mixture of photochromic additive and a stabilizing amount of a stabilizing compound and to provide the stabilizing mixtures of the photochromic compounds and stabilizers per se.

These and other objects will become more apparent to those skilled in the art upon reading the more detailed description set forth hereinbelow.

Photochromic compounds, as is well known to those skilled in the art, are compounds which undergo a color change upon being subjected to ultraviolet or visible light and revert back to their original color when they are removed from the light or when they are subjected to light of a different wavelength.

Generally these compounds change their color when exposed to ordinary sunlight and revert back to their original color upon removal thereof from the rays of the sun. Various other materials, however, as mentioned above, change color only when subjected to a certain degree of irradiation, and as such, sunlight will not effect them. High intensity radiation, such as 10–25 cal./cm.²/sec. or more is necessary in regard to these compounds while sunlight (0.2 cal./cm.²/sec.) will effect the former.

As mentioned above, we have now discovered that the lifetime of a photochromic system can be considerably lengthened or extended by adding thereto an agent to prevent the molecular degradation thereof during the cycle of color change which occurs upon contact of the photochromic system with irradiation. We have found that generally every known type of photochromic system can be so treated, the only exception being those photochromic systems which display photochromic behavior by virtue of the formation of colored free radicals. The inability of these systems to be so stabilized results, in the main, from the fact that the stabilizing additives or agents are not chemically inert in regard to the colored free radicals formed and therefore the colored system is destroyed by the agent upon initial contact with the irradiation source.

Our novel method is applicable, however, to the majority of known photochromic systems. To be more precise, our method can be utilized to lengthen the active lives of any photochromic system whose color change or photochromic phenomena results from (1) reversible intramolecular hydrogen transfer, (2) molecular rearrangement (valence tautomerization) (3) geometrical rearrangement, (4) dissociation, or (5) a combination of two or more of these processes. Therefore, such known photochromic compounds as those of the formulae

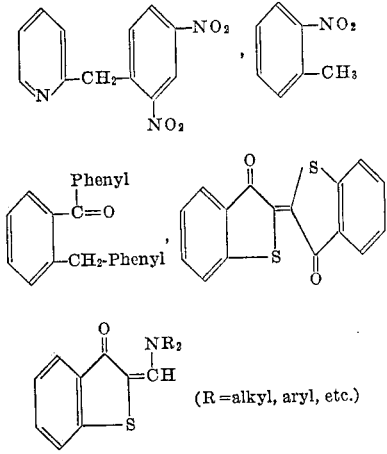

the indenone oxides, such as those having the formula

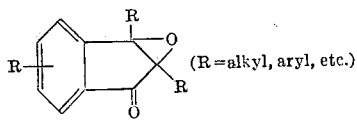

the spiropyrans, such as those having the formula

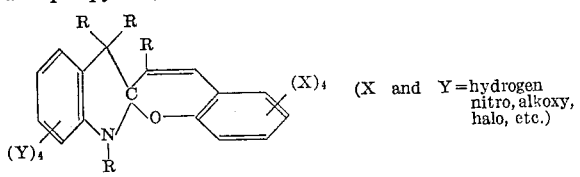

(R=hydrogen, alkyl, etc.), i.e., those compounds set forth in copending U.S. application Ser. No. 239,333, filed Nov. 21, 1962, and now U.S. Patent No. 3,212,898, and additionally, those photochromic compounds such as those set forth in copending U.S. application Ser. No. 312,850, filed Oct. 1, 1963, those having the formula

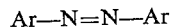

$Ar_3C$—CN (Ar=aryl), the dithizonates such as mercury bis-dithizonate and the like may be treated in our novel process.

Compounds which may be used according to the novel process of the present invention to stabilize photochromic systems, as set forth hereinabove, include dimethylamine, diethylamine, dipropylamine, di-t-butylamine, di-n-hexylamine, dicyclohexylamine, diphenylamine, dinaphthylamine, naphthylphenylamine, ethylmethylamine, butylpropylamine, ethylaniline, methylaniline, ethylaminonaphthylene, 2,6-dimethylpiperidine, 2,2,6,6,-tetramethylpyrolidine, trimethylamine, triethylamine, tripropylamine, tri-n-butylamine, dibutylethylamine, diethylmethylamine, trihexylamine, tricyclohexylamine, dicyclohexylmethylamine, dibutylphenylamine, dimethylphenylamine, diethylnaphthylamine, dicyclohexylphenylamine, ethylmethylphenylamine, and the like as representative of (A).

Additionally, as representative of (B), triphenylphosphine, tritolylphosphine, trinaphthylphosphine, methyldiphenylphosphine, ethyldiphenylphosphine, t-butyldiphenylphosphine, cyclohexyldiphenylphosphine, dimethylphenylphosphine, diethylphenylphosphine, dipropylphenylphosphine, dimethylnaphthylphosphine, diethylnaphthylphosphine, dihexylphenylphosphine, dicyclohexylnaphthylphosphine, and the like are exemplary.

Various arsines which are representative of (C), and, as such, are within the scope of the present invention, include triphenylarsine, tritolylarsine, trixylylarsine, trinaphthylarsine, and the like.

The preferred group of compounds which we have found useful in the process of the present invention are those indicated as Group (D), above. Examples of compounds of this group include di-t-butyl nitroxide,
t-butyl phenyl nitroxide,
t-cumyl 2,6-dimethoxyphenyl nitroxide,
bis-(2,6-dimethoxyphenyl) nitroxide,
phenyl 2,6-dimethoxyphenyl nitroxide,
2,6-dimethoxyphenyl p-anisyl nitroxide,
1,1,5,5-tetramethylphentamethylene nitroxide,
1,1-dimethyl-3(N-phenyloximino)butylphenyl nitroxide,
1,1-dimethyl-3(N-p-tolyloximino)butyl p-tolyl nitroxide,
1,1-dimethyl-3(N-m-tolyl-oximino)butyl-m-tolyl nitroxide,
diphenylamino picryl nitroxide,
di-(2,4,6-trimethoxyphenyl) nitroxide,
di-p-anisyl nitroxide,
di-p-ethoxyphenyl nitroxide,
di(2,4-dimethoxyphenyl)nitroxide,
di(2,6-dimethyl-4-methoxyphenyl) nitroxide,
di(2,4-dimethoxy-6-methylphenyl) nitroxide
p-porphyrexide(5,5-dimethyl-2,4-diimino-1-imidazolidyl-1-oxide),
dichloroporphyrexin(5,5-dimethyl-2,4-di(N-chloroimino)-1-imidazolidyl-1-oxide,
2,4-diimino-1,3-diazospiro-[4,5]-1-decyl-1-oxide,
di(p-nitrophenyl)nitroxide,
diphenyl nitroxide and the like.

Examples of compounds representative of (E) include dinitrobenzene, dinitrotoluene, dinitroxylene, trinitrobenzene, trinitrotoluene, dinitroanisole, trinitroanisole, 2,4-dinitro-3-hexoxybenzene and the like.

As mentioned above, mixtures of any of the above illustrated compounds useful in the present invention can also be used to produce the unexpected results we have achieved. Examples of such mixtures include triethylamine and di-t-butyl nitroxide, triethylamine and triphenylphosphine, triphenylphosphine and di-t-butyl nitroxide, etc. More specific examples of such mixtures are set forth hereinbelow in the examples.

Any amount of additive necessary to stabilize the photochromic compound may be used in our novel process, however, we have generally found that amounts ranging from about 0.0001% to about 7.0%, by weight, based on the weight of the photochromic media, (i.e., solution or polymeric material), may be used, with amounts ranging from about 0.0001% to about 3.0%, by weight, being preferred.

The additives are all generally well known in the art and may be prepared according to any known method. The preferred group of additives, i.e., the nitroxides, may also be prepared by known procedures such as those taught in U.S. Patent 2,619,479 and copending applications to Hoffman and Henderson, Ser. No. 129,560, filed Aug. 7, 1961 and Hoffman and Feldman, Ser. No. 242,078, filed Dec. 4, 1962, said procedures, however, forming no part of the instant invention.

In a further modification of our invention, the stabilized additives may be added to any photochromic material which may then be utilized to form compositions of matter by blending them with various polymers. Compositions of this type may be used to produce variable transparency and transmission glasses and windowpanes, computer memory tapes, photography apparatus, photocopying, photochromic printing inks, novelty, jewelry, toys and the like.

Examples of such polymeric resinous compositions include those formed from our novel photochromic compound-stabilizer compositions and such materials as acrylic and methacrylic polymers, styrene polymers, vinyl halide polymers, cyanoethylated cellulosic materials, aminoplast resins, polyester resins, and the like. These resultant compositions may be formed into disks, plates, films, foils, castings, alone or supported on various solid substrates such as paper, glass, cloth and the like by any known molding, casting, spray-drying, etc., technique. For example, poly(methyl methacrylate), poly(ethyl acrylate), polystyrene, poly(p-methyl styrene), poly(vinyl chloride), and the like, copolymers of such monomers with acrylonitrile, acrylamide, and the like may also be used with those acrylate, methacrylate, styrene or vinyl halide monomers expressed above.

Additionally, cyanoethylated cellulosic materials such as those produced from the cellulose of wood pulp or wood fiber, alpha-cellulose flock, viscose, cotton linters, cotton, jute, ramey, linen, and the like in such forms as fibers, yarns, fabrics, raw stock, batting, and the like, may be used. Generally these materials may have, after cyanoethylation by known procedures, a nitrogen content of as high as 13% and a degree of substitution of about 3. A nitrogen content of at least 10% and a corresponding degree of substitution of about 2.3 is generally considered sufficient. Procedures for the production of such materials are shown in U.S. Patents 2,375,847, 2,840,446, 2,786,736, 2,860,946, 2,812,999.

The aminoplast resins which may be used are synthetic resins prepared by the condensation reaction of an amino, imino, amido or imido compound with an aldehyde. Resinous condensates of this type can be found in U.S. Patents 2,917,357, 2,310,004, 2,328,592 and 2,260,239.

The polyester resins useful in the present invention may be either thermoplastic or thermosetting and are equally well known in the art. They may be prepared by reacting polycarboxylic acids, or their anhydrides, with polyhydric alcohols. The thermosetting polyesters are prepared using a procedure wherein one of the reactive components contains alpha,beta-ethylenic unsaturation.

In forming the thermoplastic polyester resins, saturated polyols are reacted with non-polymerizable polycarboxylic acids, i.e, acids which are saturated or which contain only benzenoid unsaturation.

Any amount of our novel photochromic mixtures may be incorporated into the desired resinous media, the amount used generally depending upon the intensity of the color of the composition desired upon irradiation thereof. Amounts of photochromic material ranging from about 0.01% to about 10% (by weight) based on the weight of the resinous polymer, are considered adequate.

Physical blending of the photochromic system and the resinous media may be conducted by any known procedure such as by utilizing a ball mill, a tumbler mixer, hot rolls, emulsion blending techniques, Banbury mixers, devolatilizer-extruders and the like.

The compositions may be further modified with such compatible materials as fillers, lubricants, plasticizers, pigments, dyes, and the like.

The following examples are set forth for purposes of illuustration only and are not to be construed as limitations on the present invention except as set forth in the appended claims. All parts and percentages are by weight unless otherwise specified.

Example 1

To a solution of 2 parts of 2,3-diphenylindenoneoxide, in 1500 parts of benzene, is added 35 parts of o,p-dinitrobenzene. On continuous irradiation with a standard ultraviolet light, the above solution retains its reversible photochromic property (i.e., becomes colored in the light and loses its color in visible light) for 370 minutes, 4.1 times as long as a standard solution containing no o,p-dinitrobenzene.

Example 2

Following the procedure of Example 1 except that 29 parts of 1,3,5-trinitrobenzene are utilized, the solution retains its reversible photochromic property for 420 minutes which is 4.7 times as long as a standard solution.

Example 3

Again following the procedure of Example 1 except that 0.82 part of 1,1,5,5-tetramethylpentamethylene nitroxide is utilized, the solution retains its reversible photochromic property for 420 minutes which is 4.7 times as long as a standard solution.

Example 4

The procedure of Example 1 is again followed except that 0.46 part of bis(2,6-dimethoxyphenyl) nitroxide is utilized. The solution retains its reversible photochromic property for 435 minutes which is 4.8 times as long as a standard solution.

Example 5

Again following the procedure of Example 1 except that 1.6 parts of di-t-butyl nitroxide are utilized, the solution retains its reversible photochromic property for 480 minutes which is 5.3 times as long as a standard solution.

Example 6

The procedure of Example 1 is again followed except that 36 parts of triphenylphosphine are utilized. The solution retains its reversible photochromic property for 395 minutes which is 4.4 times as long as a standard solution.

Example 7

To a solution of 2 parts of 1',3',3'-trimethyl-6-nitrospiro-2H-1-benzopyran 2,2-indoline in 1500 parts of benzene is added 0.63 part of 1,1,5,5-tetramethylpentamtehylene nitroxide. On continuous irradiation with a standard ultraviolet light, the solution retains its reversible photochromic property for 1320 minutes, 5.1 times as long as a standard solution containing no additive.

Example 8

Following the procedrue of Example 7 except that 8.1 parts of 2,6-dimethoxyphenyl t-butyl nitroxide are used as the additive, the solution retains its reversible photochromic property for 1100 minutes, which is 4.3 times as long as a standard solution.

Example 9

Again following the procedure of Example 7 except that 0.35 part of bis(2,6-dimethoxyphenyl) nitroxide is utilized, the solution retains its reversible photochromic property for 720 minutes, which is 2.8 times as long as a standard solution.

Example 10

The procedure of Example 7 is again followed except that 1.3 parts of di-t-butyl nitroxide are utilized. The solution retains its reversible photochromic property for 1300 minutes, which is 5.0 times as long as a standard solution.

Following the procedure of Example 1, various different additives, all within the scope of the present invention, were added to several photochromic compounds in order to produce a stabilized photochromic system. The results of these various additions are set forth hereinbelow in Table I.

TABLE I

| Ex. | Photochromic Compound | Additive | Parts | Ret.* (min.) | Increase** |
|---|---|---|---|---|---|
| 11 | DPIO | DMPTN | 0.65 | 370 | 4.1 |
| 12 | DPIO | BDMPN | 0.046 | 340 | 3.7 |
| 13 | DPIO | DBN | 1.6 | 360 | 4.0 |
| 14 | DPIO | TEA | 0.2 | 330 | 3.7 |
| 15 | DPIO | DPA | 11 | 415 | 4.5 |
| 16 | DPIO | PNA | 0.033 | 305 | 3.3 |
| 17 | DPIO | TMA | 2.1 | 330 | 3.7 |
| 18 | DPIO | TPP | 36 | 410 | 4.4 |
| 19 | OBBP | DMA | 1.5 | 110 | 3.2 |
| 20 | OBBP | DHA | 2.0 | 125 | 3.6 |
| 21 | ONPM | DCHA | 5.0 | 160 | 3.2 |
| 22 | ONPM | DNA | 10 | 135 | 2.7 |
| 23 | ONPM | BMA | 25 | 130 | 2.6 |
| 24 | AB | NPA | 0.5 | 200 | 1.9 |
| 25 | AB | DMP | 0.05 | 225 | 2.1 |
| 26 | TDAPA | MA | 3.0 | 440 | 3.1 |
| 27 | TDAPA | EDPP | 15 | 420 | 2.7 |
| 28 | TDAPA | TPA | 10 | 410 | 2.4 |
| 29 | TDAPA | BDMPN | 1.0 | 450 | 3.4 |
| 30 | MBD | DTBTN | 3.5 | 170 | 4.2 |
| 31 | MBD | DNB | 0.4 | 160 | 3.9 |
| 32 | TI | TNA | 7.0 | 340 | 2.6 |
| 33 | MITN | DMNP | 0.5 | 1,150 | 3.1 |
| 34 | DPIO | TEA-DBN | 25 | 435 | 4.8 |
| 35 | DPIO | TEA-TPP | 5.0 | 425 | 4.7 |
| 36 | DPIO | TPP-DBN | 3.5 | 430 | 4.75 |
| 37 | TPPO | DNPN | 0.01 | 195 | 4.6 |
| 38 | TNBI | TMP | 0.75 | 1,320 | 5.1 |
| 39 | TNBI | MP | 0.55 | 1,180 | 4.5 |
| 40 | TNBI | THA | 4.0 | 940 | 3.6 |
| 41 | TNBI | DMPA | 1.5 | 1,050 | 4.0 |
| 42 | TNBI | DHPA | 3.1 | 1,200 | 4.6 |
| 43 | TNBI | DMNA | 2.0 | 1,290 | 5.0 |
| 44 | TNBI | DHNA | 6.1 | 1,000 | 3.8 |
| 45 | TNBI | DMPP | 0.9 | 1,120 | 4.3 |
| 46 | OBBP | DHPP | 1.0 | 120 | 3.5 |
| 47 | OBBP | DHNP | 0.6 | 95 | 2.7 |
| 48 | DAPA | DPMP | 1.7 | 420 | 3.3 |
| 49 | DAPA | DPHP | 6.1 | 390 | 2.7 |
| 50 | DAPA | DNMP | 4.0 | 410 | 2.9 |
| 51 | DAPA | DNHP | 3.7 | 440 | 3.1 |
| 52 | TPPO | TNP | 6.2 | 210 | 4.9 |
| 53 | TPPO | TNAR | 0.01 | 180 | 4.2 |
| 54 | TPPO | DNAN | 0.06 | 190 | 4.5 |
| 55 | MITN | DNHB | 7.0 | 1,100 | 2.9 |
| 56 | MITN | TNHB | 2.5 | 1,200 | 3.2 |
| 57 | DPIO | DPN | 1.6 | 480 | 4.3 |
| 58 | DPIO | CMPN | 0.9 | 440 | 4.0 |
| 59 | DPIO | MPAN | 4.2 | 435 | 3.9 |
| 60 | DPIO | PAPN | 1.5 | 395 | 3.6 |
| 61 | MDB | DAN | 7.4 | 420 | 3.8 |
| 62 | MDB | EPN | 3.1 | 440 | 4.0 |
| 63 | MDB | DMPN | 0.05 | 440 | 4.0 |
| 64 | MDB | PMIO | 10.0 | 410 | 3.7 |
| 65 | MDB | CPIO | 1.6 | 400 | 3.6 |
| 66 | MDB | IDDO | 3.1 | 450 | 4.1 |
| 67 | MDB | DPNX | 0.07 | 425 | 3.85 |

In Table I, Ret.*=color retention in the dark; Increase**=reversible photochromic property, times longer than standard solution; DPIO=2,3-diphenylindenone oxide; OBBP=p-benzylbenzoylphenone; ONPM=o-nitrodiphenylmethane; TDAPA=tris(p-dimethylaminophenyl) acetonitrile; AB=azobenzene; MBD=mercuric bis-dithizonate; TI=thio indigo; MITN=2-(methylimino)-3-(2H)-thianaphthenone; TPPO=2,4,6-triphenylpyrylium-3-oxide; DMPTN=2,6-dimethoxyphenyl t-butyl nitroxide; BDMPN=bis(2,6 - dimethoxyphenyl)nitroxide; DBN=di - t - butyl nitroxide; TEA=triethylamine; DPA=diphenylamine; PNA=phenylnaphthylamine; TMA=trimethylamine; TPP=triphenylphosphine; DMA=dimethylamine; DHA=dihexylamine; DCHA=dicyclohexylamine; DNA=dinaphthylamine; BMA=butylnaphthylamine; NPA=naphthylphenylamine; DMP=dimethylphosphine; MA=methylaniline; EDPP=ethyldiphenylphosphine; TPA=triphenylarsine; DTBTN=1,1-dimethyl-3(N-p-tolyloximino)butyl p-tolyl nitroxide; DNB=dinitrobenzene; TNA=trinitroanisole; DMNP=dimethylnaphthylphosphine; DNPN=di(p-nitrophenyl) nitroxide; TNBI=1′,3′,3′-trimethyl-6-nitrospiro-2H-1-benzopyran 2,2′-indoline; TMP=2,2,6,6-tetramethylpyrolidine; MP=2,6-dimethylpiperidine; THA=trihexylamine; DMPA=dimethylphenylamine; DHPA=dihexylphenylamine; DMNA=dimethylnaphthylamine; DHNA=dihexylnaphthylamine; DMPP=dimethylphenylphosphine; DHPP=dihexylphenylphosphine; DHNP=dihexylnaphthylphosphine; DPMP=diphenylmethylphosphine; DPHP=diphenylhexylphosphine; DNMP=dinaphthylmethylphosphine; DNHP=dinaphthylhexylphosphine; TNP=trinaphthylphosphine; TNAR=trinaphthylarsine; DNAN=dinitroanisole; DNHB=2,4-dinitro-3-hexoxybenzene; TNHB=2,4,5-trinitro-3-hexoxybenzene; CMPN=t - cumyl - 2,6 - dimethoxyphenyl nitroxide; MPAN=2,6 - dimethoxyphenyl p - anisyl nitroxide; DPN=di-p-ethoxyphenyl nitroxide; PAPN=diphenylaminopicryl nitroxide; DAN=di - p - anisyl nitroxide; EPN=di(o-nitrophenyl) nitroxide; DMPN=di(2,4-dimethoxy - 6 - methylphenyl) nitroxide; PMIO=p-porphyrexide(5,5-dimethyl - 2,4-diimino - 1-imidazolidyl - 1-oxide); CPIO=dichloroporphyrexin(5,5 - dimethyl - 2,4-di(N-chloroimino)-1-imidazolidyl - 1-oxide; IDDO=2,4-diimino - 1,3-diazospiro - [4,5] - 1 - decyl - 1 - oxide; DPNX=diphenyl nitroxide.

*Example 68*

100 parts of a benzene solution of poly(methyl methacrylate) (25% solid) and 15 parts of the photochromic system of Example 1 are drawn down on a glass plate and allowed to set for 8 hours to remove the solvent. The resultant film turns color when subjected to irradiation and returns to its original color when placed in the dark. Furthermore, the color stability in the dark and the reversible photochromic property of the film are longer than a standard film with a photochromic stabilizer.

Following the procedure of Example 68, various resinous media were blended with exemplary photochromic systems to produce films. In each instance, the film turned color when subjected to ultraviolet light and retained its reversible photochromic property for a period substantially longer than a control film containing a photochromic compound to which had been added no stabilizer.

TABLE II

| Ex. | Resinous Media | Photochromic System of Example | Retention of Reversible Photochromic Property | Color Stability In Dark* |
|---|---|---|---|---|
| 69 | PE*** | 3 | Yes | L |
| 70 | CC | 4 | Yes | ML |
| 71 | PS | 5 | Yes | ML |
| 72 | PVC | 7 | Yes | L |
| 73 | MF** | 10 | Yes | VML |
| 74 | MMA/ST/AN | 14 | Yes | L |
| 75 | PEA | 18 | Yes | L |
| 76 | PE | 22 | Yes | L |
| 77 | CC | 29 | Yes | ML |
| 78 | PMS | 34 | Yes | ML |
| 79 | PVCL | 36 | Yes | VML |

Code for Table II: *=compared to standard with no photochromic stabilizer; =molding; *=casting; L=longer; ML=much longer; VML=very much longer; PMMA=poly(methyl methacrylate); PE=a commercially available polyester resin of maleic anhydride, phthalic anhydride, and propylene glycol (15.0/46.0/39.0); CC=a commercially available cyanoethylated cellulose (nitrogen content, 13%; degree of substitution, 2.8); PS=polystyrene; MF=melamine/formaldehyde resin; PVC=poly(vinyl chloride); MMA/ST/AN=terpolymer of methyl methacrylate; styrene/acrylonitrile (71/19/10); PEA=poly(ethyl acrylate); PMS=poly(p-methylstyrene); PVCL=polyvinylidene chloride.

We claim:

1. A method for the stabilization of photochromic compounds capable of being stabilized against molecular deterioration which comprises intimately blending with the photochromic compound a stabilizing amount of a compound selected from the group consisting of (1) a compound having the formula

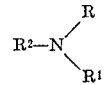

wherein R is selected from the group consisting of hydrogen and an alkyl ($C_1$–$C_6$) radical and $R^1$ and $R^2$ are, individually, selected from the group consisting of an aryl ($C_6$–$C_{10}$) and an alkyl ($C_1$–$C_6$) radical, and when R is hydrogen, $R^1$ and $R^2$ are selected from the group consisting of alkyl, aryl radicals and a 5 to 6 membered alkylenimine ring formed together with the nitrogen and when R is an alkyl radical, $R^1$ and $R^2$ are selected from the group consisting of alkyl radicals and aryl radicals, no more than one of $R^1$ and $R^2$ being an aryl radical, (2) a phosphine having the formula

wherein $R^3$ and $R^4$ are, individually, selected from the group consisting of an alkyl radical ($C_1$–$C_6$) and an aryl radical ($C_6$–$C_{10}$) and Z is an aryl radical ($C_6$–$C_{10}$), (3) an arsine having the formula

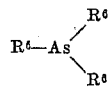

wherein $R^6$ is an aryl radical ($C_6$–$C_{10}$), (4) a nitroxide, (5) a nitro compound having the formula

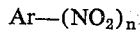

wherein Ar is selected from the group consisting of a monocyclic aryl radical and a monocyclic alkoxy substituted aryl radical and $n$ is a whole positive integer of from 2 to 3, inclusive, and (6) mixtures thereof.

2. A method according to claim 1 wherein the stabilizing compound is diphenylamine.

3. A method according to claim 1 wherein the stabilizing compound is triphenylphosphine.

4. A method according to claim 1 wherein the stabilizing compound is di-t-butyl nitroxide.

5. A method according to claim 1 wherein the stabilizing compound is a mixture of triphenylphosphine and di-t-butyl nitroxide.

6. A method according to claim 1 wherein the stabilizing compound is a mixture of triethylamine and di-t-butyl nitroxide.

7. A photochromic composition consisting of a photochromic compound blended therewith a stabilizing amount of a compound selected from the group consisting of (1) a compound having the formula

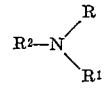

wherein R is selected from the group consisting of hydrogen and an alkyl ($C_1$–$C_6$) radical and $R^1$ and $R^2$ are, individually, selected from the group consisting of an aryl ($C_6$–$C_{10}$) and an alkyl ($C_1$–$C_6$) radical, and when R is hydrogen, $R^1$ and $R^2$ are selected from the group consisting of alkyl, aryl radicals and a 5 to 6 membered alkylenimine ring formed together with the nitrogen and when R is an alkyl radical, $R^1$ and $R^2$ are selected from the group consisting of alkyl radicals and aryl radicals, no more than one of $R_1$ and $R_2$ being an aryl radical, (2) a phosphine having the formula

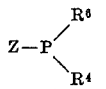

wherein $R^3$ and $R^4$ are, individually, selected from the group consisting of an alkyl radical ($C_1$–$C_6$) and an aryl radical ($C_6$–$C_{10}$) and Z is an aryl radical ($C_6$–$C_{10}$), (3) an arsine having the formula

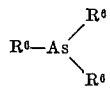

wherein $R^6$ is an aryl radical ($C_6$–$C_{10}$), (4) a nitroxide, (5) a nitro compound having the formula

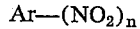

wherein Ar is selected from the group consisting of a monocyclic aryl radical and a monocyclic alkoxy substituted aryl radical and $n$ is a whole positive integer of from 2 to 3, inclusive, and, (6) mixtures thereof.

8. A photochromic compound capable of being stabilized against molecular deterioration having intimately blended therewith diphenylamine.

9. A photochromic compound capable of being stabilized against molecular deterioration having intimately blended therewith triphenylphosphine.

10. A photochromic compound capable of being stabilized against molecular deterioration having intimately blended therewith di-t-butyl nitroxide.

11. A photochromic compound capable of being stabilized against molecular deterioration having intimately blended therewith a mixture of triphenylphosphine and di-t-butyl nitroxide.

12. A photochromic compound capable of being stabilized against molecular deterioration having intimately blended therewith a mixture of triethylamine and di-t-butyl nitroxide.

13. a composition of matter comprising a polymeric material having uniformly dispersed throughout the body thereof a photochromic material capable of being stabilized against molecular deterioration having intimately blended therewith a stabilizing amount of a compound selected from the group consisting of (1) a compound having the formula

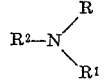

wherein R is selected from the group consisting of hydrogen and an alkyl ($C_1$–$C_6$) radical and $R^1$ and $R^2$ are, individually, selected from the group consisting of an aryl ($C_6$–$C_{10}$) and an alkyl ($C_1$–$C_6$) radical, and when R is hydrogen, $R^1$ and $R^2$ are selected from the group consisting of alkyl, aryl radicals and a 5 to 6 membered alkylenimine ring formed together with the nitrogen and when R is an alkyl radical, $R^1$ and $R^2$ are selected from the group consisting of alkyl radicals and aryl radicals, no more than one of $R^1$ and $R^2$ being an aryl radical, (2) a phosphine having the formula

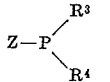

wherein $R^3$ and $R^4$ are, individually, selected from the group consisting of an alkyl radical ($C_1$–$C_6$) and an aryl radical ($C_6$–$C_{10}$) and Z is an aryl radical ($C_6$–$C_{10}$), (3) an arsine having the formula

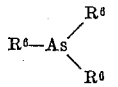

wherein $R^6$ is an aryl radical ($C_6$–$C_{10}$), (4) a nitroxide, (5) a nitro compound having the formula

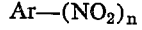

wherein Ar is selected from the group consisting of a monocyclic aryl radical and a monocyclic alkoxy substituted aryl radical and n is a whole positive integer of from 2 to 3, inclusive, and, (6) mixtures thereof.

14. A composition of matter comprising a polymeric material capable of being stabilized against molecular deterioration having uniformly dispersed throughout the body thereof a photochromic material having intimately blended therewith a stabilizing amount of diphenylamine.

15. A composition of matter comprising a polymeric material capable of being stabilized against molecular deterioration having uniformly dispersed throughout the body thereof a photochromic material having intimately blended therewith a stabilizing amount of triphenylphosphine.

16. A composition of matter comprising a polymeric material capable of being stabilized against molecular deterioration having uniformly dispersed throughout the body thereof a photochromic material having intimately blended therewith a stabilizing amount of di-t-butyl nitroxide.

17. A composition of matter comprising a polymeric material capable of being stabilized against molecular deterioration having uniformly dispersed throughout the body thereof a photochromic material having intimately blended therewith a stabilizing amount of a mixture of triphenylphosphine and di-t-butyl nitroxide.

18. A composition of matter comprising a polymeric material capable of being stabilized against molecular deterioration having uniformly dispersed throughout the body thereof a photochromic material having intimately blended therewith a stabilizing amount of a mixture of triethylamine and di-t-butyl nitroxide.

References Cited

UNITED STATES PATENTS 3,140,948  7/1964  Stewart et al. _____ 96—90 X
3,212,898  10/1965  Cerreta _____ 96—90

NORMAN G. TORCHIN, *Primary Examiner.*

D. D. PRICE, C. E. DAVIS, *Assistant Examiners.*